Sept. 9, 1969  J. H. HENDERSON  3,465,503
AIR DRYER AND BYPASS STRUCTURE THEREFOR
Filed May 27, 1968
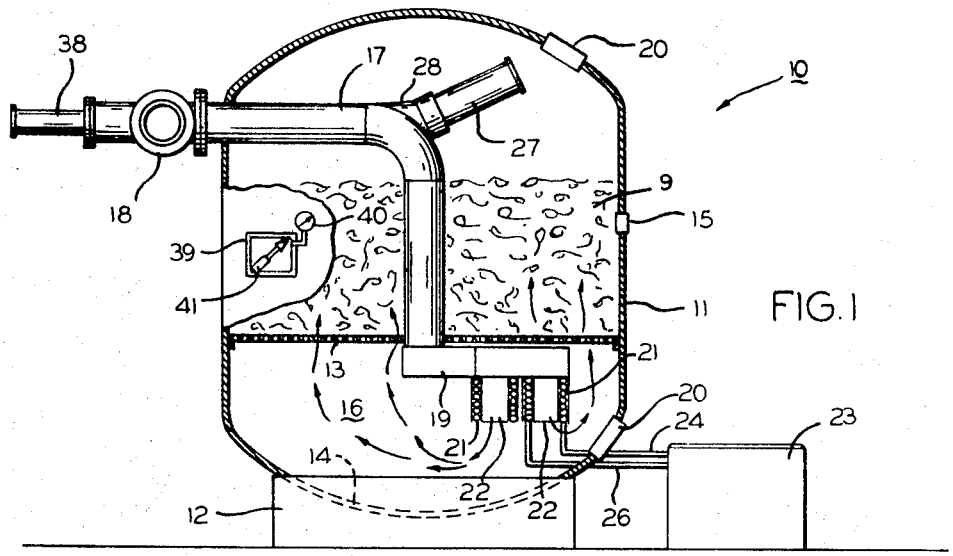
INVENTOR
JOSEPH H. HENDERSON
BY *Richard C. Lindberg*
ATTORNEY United States Patent Office 3,465,503
Patented Sept. 9, 1969

3,465,503
AIR DRYER AND BYPASS STRUCTURE THEREFOR
Joseph H. Henderson, 5400 McDermott Drive,
Berkeley, Ill. 60163
Filed May 27, 1968, Ser. No. 732,134
Int. Cl. B01d 53/14, 53/26
U.S. Cl. 55—163     5 Claims

ABSTRACT OF THE DISCLOSURE

An air dryer having structure for selectively placing the dryer in "on-stream" condition or bypassing the air stream around the dryer, valves positioned on the upstream and downstream sides of the dryer for determining whether the dryer is on stream or in bypass condition, air operated motors for operating said valves to on stream or bypass position, and control means for reducing the effort necessary to operate said motors and for preventing a rush of air to a dessicant bed in said dryer when the same is returned from bypass to on stream condition.

---

The structure according to the present invention finds application in systems supplying large quantities of dry, oil and contaminant free compressed air for a number of industrial processes or operations. Air dryers are located in the pressure lines of such systems, the air moving through dessicant beds in the dryer the air also being cooled for the removal of moisture, and filtered for the removal of contaminants such as oil.

It is necessary in such systems to bypass the dryer for inspection, recharging with dessicant, and conventionally this has been done with hand operated valves placing the dryer in the on stream or bypass condition. By reason of the fact that the system is handling air at rather high pressures, care must be used in changing the dryer from the bypass to on stream condition, so as not to disturb the dessicant bed by a rush of air thereagainst.

With the foregoing considerations in mind it is a principal object of the invention to provide an air dryer and bypass structure therefor, the latter being selectively operable to bypass the dryer or place same on stream, and to operate such bypass structure with small air operated motors considering the size of the bypass valves, at the same time preventing a large surge of air to the dessicant bed when the dryer is placed in the on stream condition after being in the bypass condition.

In the drawing:

FIG. 1 is an elevation view of an air dryer and bypass structure having the improvements according to the present invention embodied therein;

FIG. 2 is a top view thereof; and

FIG. 3 is a top view of the bypass structure, certain parts being broken away, and a schematic view of the control for such bypass structure.

The improved air dryer and bypass structure is denoted generally by the reference numeral 10 and comprises a closed vessel 11 supported on a frame 12. Vessel 11 has a foraminous stage or grid 13 spaced above the bottom 14 thereof, for a dessicant bed 9. Such dessicant bed may consist of discrete pellets or tablets of dessicant material such as silica gel, calcium chloride, or other commercially available drying materials. The water separated from air moving through the dessicant bed falls by gravity into a chamber 16 below the stage 13, and is removed by an automatic drain valve, also not shown. Vessel 11 is provided with an inspection port 15 and manways 20 for loading of dessicant and inspection.

Air under pressure to be dried and removed of any contaminants, such as oil, enters the closed vessel 11 by an air inlet line 17 branching from a supply main 18. The entrant air moves downward as seen in FIG. 1 to a manifold 19 supported below the stage 13. The latter supplies air to cooling coils 21 and prefilters 22, the air emerging from the prefilters 22 taking a course as seen by the arrows up and through the dessicant bed.

A refrigeration system indicated generally by the reference numeral 23 is connected by supply line 24 and return line 26 to the cooling coils 21.

The air which has been dried in the desesicant bed then moves through a bank of after filters 27 into a manifold 28, in turn connected to an outlet line 29 having a main 31 branching therefrom.

A bypass line 32 connects inlet line 17 to outlet line 29, and a first valve 33 is located in the inlet line 17 to the closed vessel 11 while blocking the bypass line 32, and to a position shown in dotted outline to connect inlet line 17 shown in dotted outline to connect inlet line 17 to the bypass line 32.

A second valve 34 is located in the outlet line 29 and is movable to a position connecting the outlet line 29 from vessel 11 to the mian 31 while blocking the bypass line 32, and to a position shown in dotted outline to connect bypass line 32 to the main 31.

When the valves 33 and 34 are in the solid line position shown the vessel 11 is on stream performing its drying function, and when the valves 33 and 34 are in the dotted line position the vessel 11 is being bypassed, when it may be desired to check the filters 21 and 27 or the dessicant bed.

Structure is provided for operating the valves 33 and 34, and to this end each valve is connected to a piston rod 36 in turn connected to a piston 37 moving in a double acting cylinder 38.

Control structure is provided for the operation of the cylinders 38 and the valves 33 and 34 operated thereby, and comprises a selector valve 39 having an operating handle 41 which is operated to the solid line position shown to place the vessel 11 on stream or to the dotted line position shown to bypass the vessel 11.

Assuming for purposes of description hereat, that the valve 39 has been in the bypass position and that the valves 33 and 34 are in the dotted line position bypassing the vessel 11, movement of the valve handle 41 to the solid line position will place vessel 11 in the on stream condition. The valve 39 is connected in circuitry for controlling the shifting of the valves 33 and 34 placing the vessel 11 on stream, such circuitry consisting of a pressure line 42 connected to valve 39, a working line 43 connected through valve 39 and to a line 44 opening into the vessel 11, line 44 having a check valve 46 therein adapted to pass air under pressure into vessel 11 but to block the passage of air from vessel 11. A pressure gauge 40 is connected in line 43.

A pair of parallel lines 47 and 48 branch from line 43, line 47 having a check valve 49 therein blocking the air from valve 39, and line 48 having a pressure operated sequence valve 51 therein operable to unblock at a pressure corresponding to that in the vessel 11 when air no longer moves past check valve 46.

Parallel lines 47 and 48 rejoin with a line 52 connected to the piston rod ends of the cylinders 38 to raise valves 33 and 34 to the solid line on stream condition of vessel 11. The opposite ends of the cylinders 38 are relieved of pressure by a line 53 connected to valve 39 and through said valve to exhaust at exhaust line 54.

It will be noted that the vessel 11 is first pressurized to the line pressure before being put on line. Being first pressurized, there is no possibility that a rush of air will disturb the dessicant on the stage 13. Also by reason of the vessel 11 being first pressurized, the pressures across the valves 33 and 34 are completely balanced, thereby greatly minimizing the work for the cylinders 38.

When the vessel 11 is to be bypassed, handle 41 of selector valve 39 is shifted to the dotted line bypass position. In such position pressure is introduced at the piston end of cylinders 38 to drive pistons 37 and valves 33 and 34 to the dotted line position. The opposite end of cylinders 38 will be connected to exhaust by line 52, check valve 49, line 43 and through selector valve to the exhaust line 54.

I claim:

1. In an air dryer having a dessicant bed and a bypass structure selectively operable to place said dryer on stream and in bypass, said dryer comprising a closed vessel having an inlet line and an outlet line, a bypass line connecting said inlet line and said outlet line, a first valve in said inlet line movable to a position connecting said inlet line to said closed vessel while blocking said bypass line and to a position connecting said inlet line to said bypass line while blocking the connection of said closed vessel to said inlet line, a second valve in said outlet line movable to a position connecting said outlet line to said vessel while blocking said bypass line and to a position connecting said outlet line to said bypass line while blocking the connection of said closed vessel to said outlet line, first and second air operated motors for moving said first and second valves to the positions aforesaid, and control means movable to positions for operations of said motors to place said closed vessel in on stream or bypass condition, said control means when being moved from the bypass position to the on stream position including means for pressurizing said closed vessel to the pressure in said inlet and outlet lines prior to operation of said motors to place said closed vessel in the on stream position to prevent an inrush of air to said dessicant bed and thereby prevent disturbance of same.

2. An air dryer and bypass structure according to claim 1, wherein a sequence valve and a check valve are interposed between said control means and said air operated motors, and said check valve is operable to admit air under pressure to said closed vessel to bring the pressure in said closed vessel to the pressure obtaining in said inlet and outlet lines, and said sequence valve is operable to open after the pressure in said closed vessel reaches the pressure obtaining in said inlet and outlet lines to direct air under pressure to said air operated motors to move said first and second valves to the on stream position blocking said bypass line.

3. An air dryer and bypass structure according to claim 2 wherein said control means is operable to a position to place air under pressure against the piston rod side of said pistons to move the valves connected thereto to on stream position.

4. An air dryer and bypass structure according to claim 2 wherein said operated motors comprise cylinders with double acting pistons therein, and wherein said pistons are each connected by a piston rod to correlative first and second valves.

5. An air dryer and bypass structure according to claim 4, wherein said control means is operable to a position to place air under pressure against the cylinder head end of said motors to move the pistons therein and the valves connected thereto to bypass position.

References Cited

UNITED STATES PATENTS

| 2,561,441 | 7/1951 | Lou | 55—163 |
| 3,225,517 | 12/1965 | Wachsmuth | 55—31 |

FOREIGN PATENTS

| 654,801 | 12/1962 | Canada. |

REUBEN FRIEDMAN, Primary Examiner

C. N. HART, Assistant Examiner